(12) United States Patent
Wade et al.

(10) Patent No.: US 8,297,127 B2
(45) Date of Patent: Oct. 30, 2012

(54) PRESSURE SENSOR WITH LOW COST PACKAGING

(75) Inventors: Richard Wade, Worthington, OH (US); Ian Bentley, New Ipswich, NH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/986,948

(22) Filed: Jan. 7, 2011

(65) Prior Publication Data

US 2012/0174680 A1 Jul. 12, 2012

(51) Int. Cl.
*G01L 9/06* (2006.01)

(52) U.S. Cl. .......................................... 73/721; 73/727

(58) Field of Classification Search ............. 73/700–756
See application file for complete search history.

(56) References Cited

U.S. PATENT DOCUMENTS

| | | | |
|---|---|---|---|
| 4,763,098 A | 8/1988 | Glenn et al. | |
| 4,864,724 A | 9/1989 | Bergstrom | |
| 5,945,605 A | 8/1999 | Julian et al. | |
| 6,351,996 B1 | 3/2002 | Nasiri et al. | |
| 6,845,664 B1 | 1/2005 | Okojie | |
| 7,028,551 B2 | 4/2006 | Park et al. | |
| 7,997,142 B2 * | 8/2011 | Chiou et al. | 73/715 |
| 2007/0113668 A1 | 5/2007 | McMonigal | |
| 2009/0282925 A1 | 11/2009 | Machir et al. | |
| 2009/0288492 A1 * | 11/2009 | Stewart et al. | 73/716 |
| 2010/0199777 A1 * | 8/2010 | Hooper et al. | 73/721 |
| 2011/0005326 A1 * | 1/2011 | Bentley et al. | 73/754 |
| 2011/0232389 A1 * | 9/2011 | Chiou et al. | 73/721 |

* cited by examiner

*Primary Examiner* — Andre Allen
(74) *Attorney, Agent, or Firm* — Seager Tufte & Wickhem LLC

(57) ABSTRACT

A pressure sensor is disclosed that may include a minimum amount of fluid coupling packaging. In one illustrative embodiment, a pressure sensor assembly may include a pressure sensor die having a front side and a back side, and a pressure sensing diaphragm. The pressure sensor assembly may further include a housing having a mounting side and a sensing side. The sensing side may define a pressure port. The pressure sensor die may be secured to the housing such that the pressure sensing diaphragm is exposed to the pressure port, and such that front side of the pressure sense die is accessible from outside of the housing.

19 Claims, 6 Drawing Sheets

PRESSURE SENSOR WITH LOW COST PACKAGING

TECHNICAL FIELD

The present disclosure relates generally to pressure sensors, and more particularly, to pressure sensors with low cost packaging.

BACKGROUND

Pressure sensors are used in a wide variety of applications including, for example, commercial, automotive, aerospace, industrial, and medical applications. In many applications, pressure sensors may detect a pressure via a sensing element, often formed on a pressure sensing die, which converts mechanical stress caused by an incoming pressure into an electrical output signal. In some of these applications, it may be desirable to reduce the cost of the pressure sensor as much as possible.

SUMMARY

The present disclosure relates generally to pressure sensors, and more particularly, to pressure sensors for sensing a pressure of a media such as a gas or a liquid. In one illustrative embodiment, a pressure sensor assembly may include a pressure sensing die having a front side and a back side. The pressure sensing die may further include a pressure sensing diaphragm having one or more piezoresistors coupled to the pressure sensing diaphragm for sensing a pressure induced stress in the pressure sensing diaphragm. Two or more electrical bond pads may be positioned on the front side of the pressure sensor die, with each of the two or more electrical bond pads electrically coupled to one or more of the piezoresistors. The pressure sensor assembly may further include a housing having a mounting side and a sensing side. The sensing side may define a pressure port. The pressure sensor die may be secured to the housing such that the back side of the pressure sensor die faces the sensing side of the housing with the pressure sensing diaphragm exposed to the pressure port. When so secured, the front side of the pressure sensing die may be positioned adjacent to the mounting side of the housing with the two or more electrical bond pads of the pressure sensing die being accessible from outside of the housing. In some instances, the pressure port may include an elongated pressure port.

The preceding summary is provided to facilitate a general understanding of some of the innovative features of the present disclosure, and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
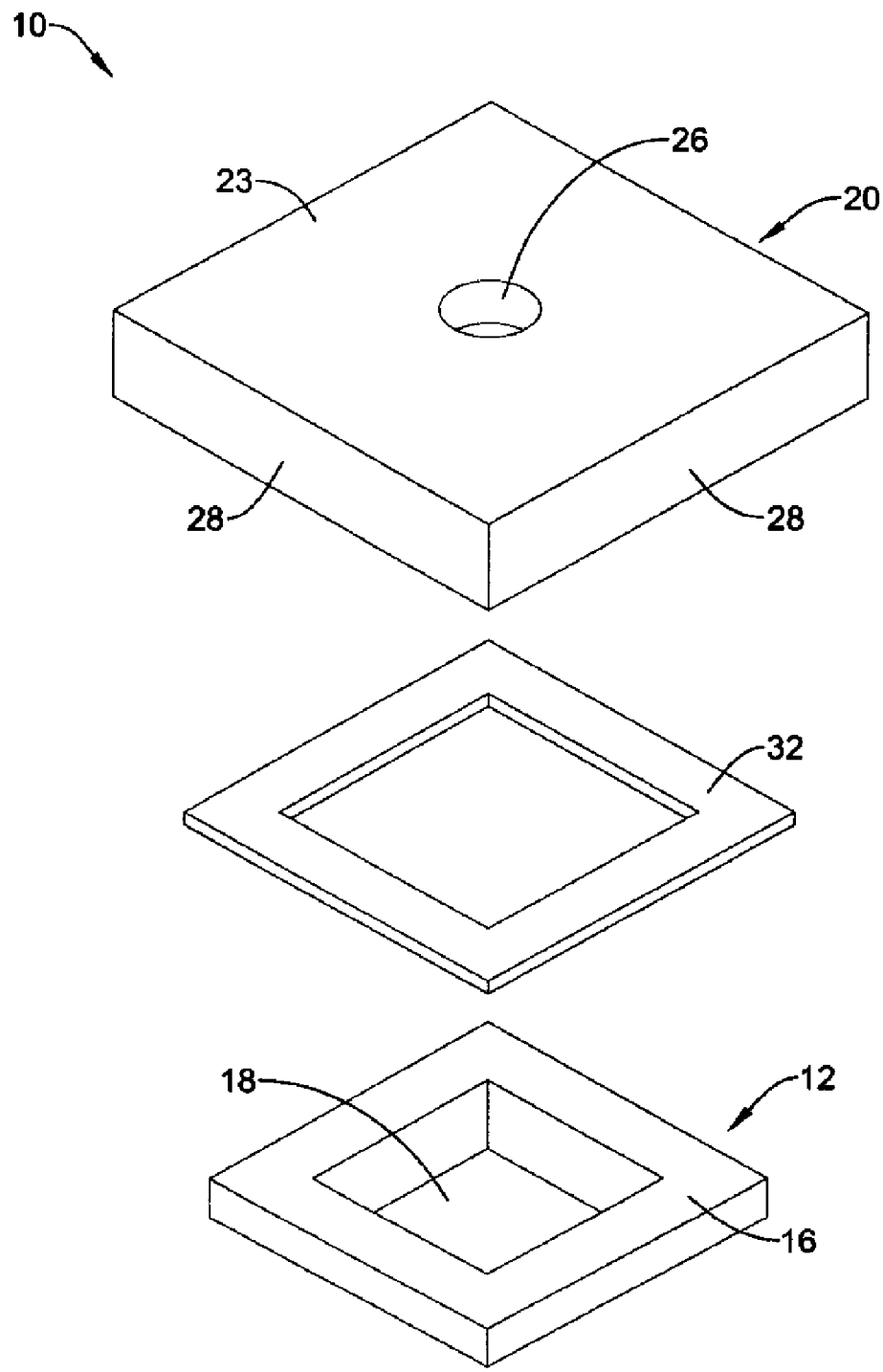
FIG. 1 is an exploded perspective top view of an illustrative pressure sensor.

While the disclosure is amenable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings in which similar elements in different drawings are numbered the same. The description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

As used herein, the term "fluid" is not intended to be limited to a liquid media. Rather the term "fluid" is considered as including any material subject to flow, such as, but not limited to, liquids and gases.

FIG. 1 is an exploded perspective top view of an illustrative pressure sensor assembly 10. The pressure sensor assembly 10 may include a porting housing 20 configured to provide a fluid connection between a pressure sensing die 12 and a customer application. The housing 20 may be formed from plastic, polyamide, ceramic, metal, or any other suitable material. While the housing 20 is illustrated as having a generally square shape, it is contemplated the housing 20 may have any shape desired. The housing 20 may include a top side 23 and a bottom side 25 (shown better in FIG. 2). In some instances, the housing 20 may include a pressure port 26 extending from the top side 23 to the bottom side 25. The pressure port 26 may be configured to allow fluid communication between an application and the pressure sensing die 12 of the pressure sensor assembly 10. While the pressure port 26 is illustrated as including a circular aperture, it is contemplated that the pressure port 26 may be adapted to include a variety of interface options and connections, as desired. For example, it is contemplated that the pressure port 26 may include any shape or size as desired, often depending on the particular application at hand. It is further contemplated that, in some embodiments, the housing 20 may not include a port 26. When so provided, the housing 20, in conjunction with the back side of the pressure sensing die, may form an enclosed cavity for containing a reference pressure.

In one illustrative embodiment, the pressure sensing die 12 may be a micromechanical sensor element fabricated using a silicon wafer and suitable fabrication techniques. The pressure sensing die 12 may include one or more pressure sensing elements and/or other circuitry (e.g. trim circuitry, signal conditioning circuitry, etc.) formed using suitable fabrication or printing techniques. In some cases, the pressure sensing die 12 may include a pressure sensing diaphragm 18 including one or more sensing elements, such as piezoresistive sensing components, formed thereon for sensing a deflection and thus a pressure differential between a top and bottom side of the pressure sensing diaphragm 18. The piezoresistors may be configured in such a manner that their resistance changes in response to the flexing of the pressure sensing diaphragm 18. In some instances, the pressure sensing diaphragm 18 may include a piezoresistive Wheatstone bridge built into a micro-machined silicon diaphragm structure. Thus, when the pressure sensor assembly 10 is arranged such that the pressure port 26 is in fluid communication with a fluid media, the pressure output of the pressure sensor assembly 10 may correspond to the changes in the resistance of the piezoresistors.

In some embodiments, the pressure sensing diaphragm 18 may be fabricated by back-side etching a silicon die, however, any suitable process may be used, as desired. The pressure sensing die 12 may include a back side 16 and an opposing front side 14 (better shown in FIG. 2). The back side 16 of the sensing die 12 may be bonded to the housing 20 using an adhesive, seal, gasket, or any other suitable bonding or sealing mechanism 32 (e.g. solder, eutectic, etc.). In some instances, the pressure sensing die 12 may be attached to the housing 20 using a stress isolating adhesive, such as, but not limited to, a silicone room temperature vulcanizing (RTV) adhesive. The seal 32 may be configured to attach the sensing die 12 to the housing 20 while allowing the pressure sensing diaphragm 18 to be exposed to the pressure port 26 defined by the housing 20.

Figure 2:
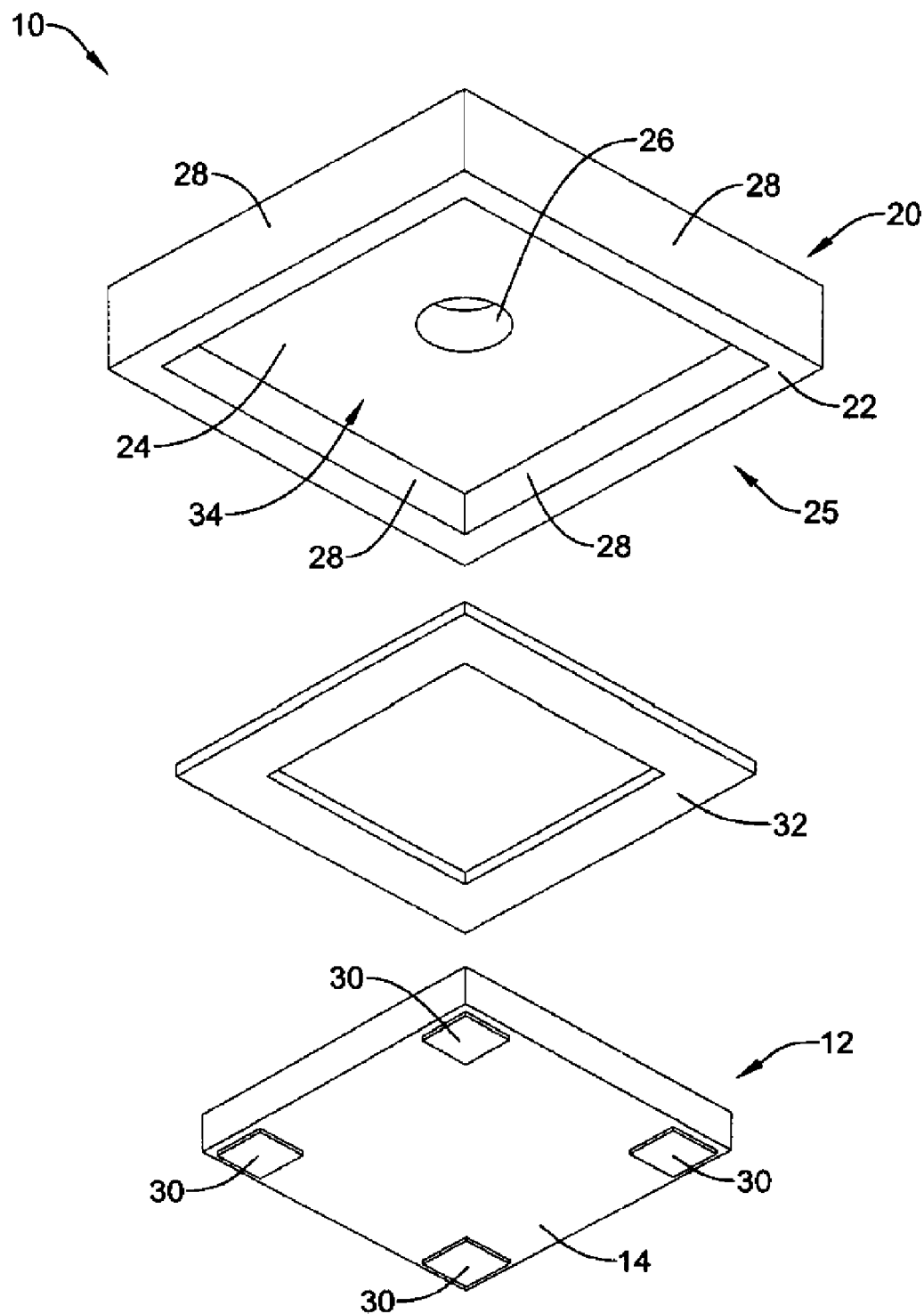
FIG. 2 is an exploded perspective bottom view of the illustrative pressure sensor of FIG. 1.

FIG. 2 illustrates an exploded perspective bottom view of the illustrative pressure sensor 10 of FIG. 1. As can be seen, the bottom side 25 of the housing 20 may include a mounting side surface 22 and a sensing side surface 24. As shown, the mounting side 22 is connected to but spaced back from the sensing side 24 by one or more lateral side walls 28. In some embodiments, the mounting side 22 may define an opening such that the sensing side 24 and the side walls 28, together define a pressure sensing die cavity 34. In some embodiments, the pressure sensing die 12 may be mounted within the die cavity 34 such that the back side 16 of the pressure sensing die 12 is facing and/or attached to an inside surface of the sensing side 24 of the housing 20. The sensing side 24 of the housing 20 may define a wall including the pressure port 26 such that when the pressure sensing die 12 is mounted within the die cavity 34, the pressure port 26 is in fluid communication with the pressure sensing diaphragm 18. A seal 32, layer of adhesive, gasket, or other sealing mechanism may be disposed between the sensing side 24 of the housing 20 and the back side 16 of the pressure sensing die 12 to secure the die 12 within the die cavity 34. When the pressure sensing die 12 is secured within the die cavity 34 of the housing, the front side 14 of the pressure sense die 12 may be positioned adjacent to (at, below, or above) the mounting side 22 of the housing 20.

The pressure sensing die 12 may include one or more electrical bond pads 30 disposed on the front side 14 of the die 12. The electrical bond pads 30 may be positioned such that the pads 30 are accessible from outside of the housing 20. In some instances, the electrical bond pads 30 may be electrically coupled to the one or more sensing elements of the pressure sensing diaphragm 18. In some embodiments, the pressure sensing die 12 may include four electrical bond pads 30, each connected to one of the four connections of a Wheatstone bridge that includes the sensing piezoresistors. However, it is contemplated that the pressure sensing die 12 may include any number of electrical bond pads 30, as desired. In some embodiments, the electrical bond pads 30 may be 0.7 millimeters by 0.3 millimeters, or any other suitable size. This may allow a customer to easily install the pressure sensor assembly 10 directly on a printed circuit board (PCB) or other interface or substrate using, for example, a solder paste solution. In another illustrative embodiment, the electrical bond pads 30 may be relatively small with bump pads attached thereto such that the pressure sensor 10 may be attached to a special interface or PCB. In some cases, the electrical bond pads 30 may extend out past the mounting side 22 of the housing 20, but this is not required.

Figure 3:
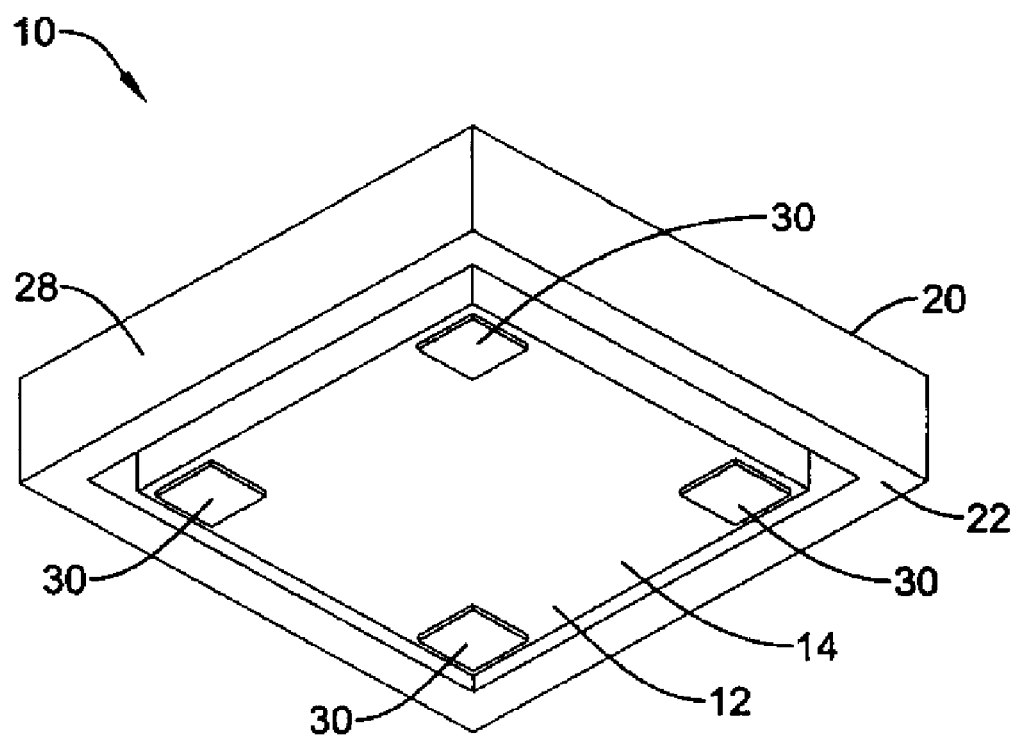
FIG. 3 is a perspective view of the illustrative pressure sensor of FIGS. 1 and 2.

FIG. 3 is a perspective view of the assembled pressure sensor 10 of FIG. 2. As can be seen, the pressure sensing die 12 may be sized and shaped to generally correspond to the size and shape of the pressure sensing die cavity 34 of the housing 20. When assembled, in some instances, the front side 14 of the pressure sensing die 12 may be adjacent to, or positioned generally near the mounting side 22 of the housing 20. However, it is contemplated that in some embodiments, the front side 14 of the pressure sensing die 12 may be recessed within the die cavity 34 or may extend out beyond the mounting side 22 of the housing 20. The pressure sensing die 12 may be positioned such that the electrical bond pads 30 are exposed, and in some cases, suitable for soldering directly to corresponding bond pads on a PCB or other substrate. While not explicitly shown in FIG. 3, the pressure sensing die 12 may be positioned within the die cavity 34 such that the pressure sensing diaphragm 18 is in fluid communication with the pressure port 26. When so positioned, the pressure sensing diaphragm 18 may be free to flex such that the one or more pressure sensing elements may sense a deflection and thus a pressure differential between a top and bottom side of the pressure sensing diaphragm 18.

Figure 4:
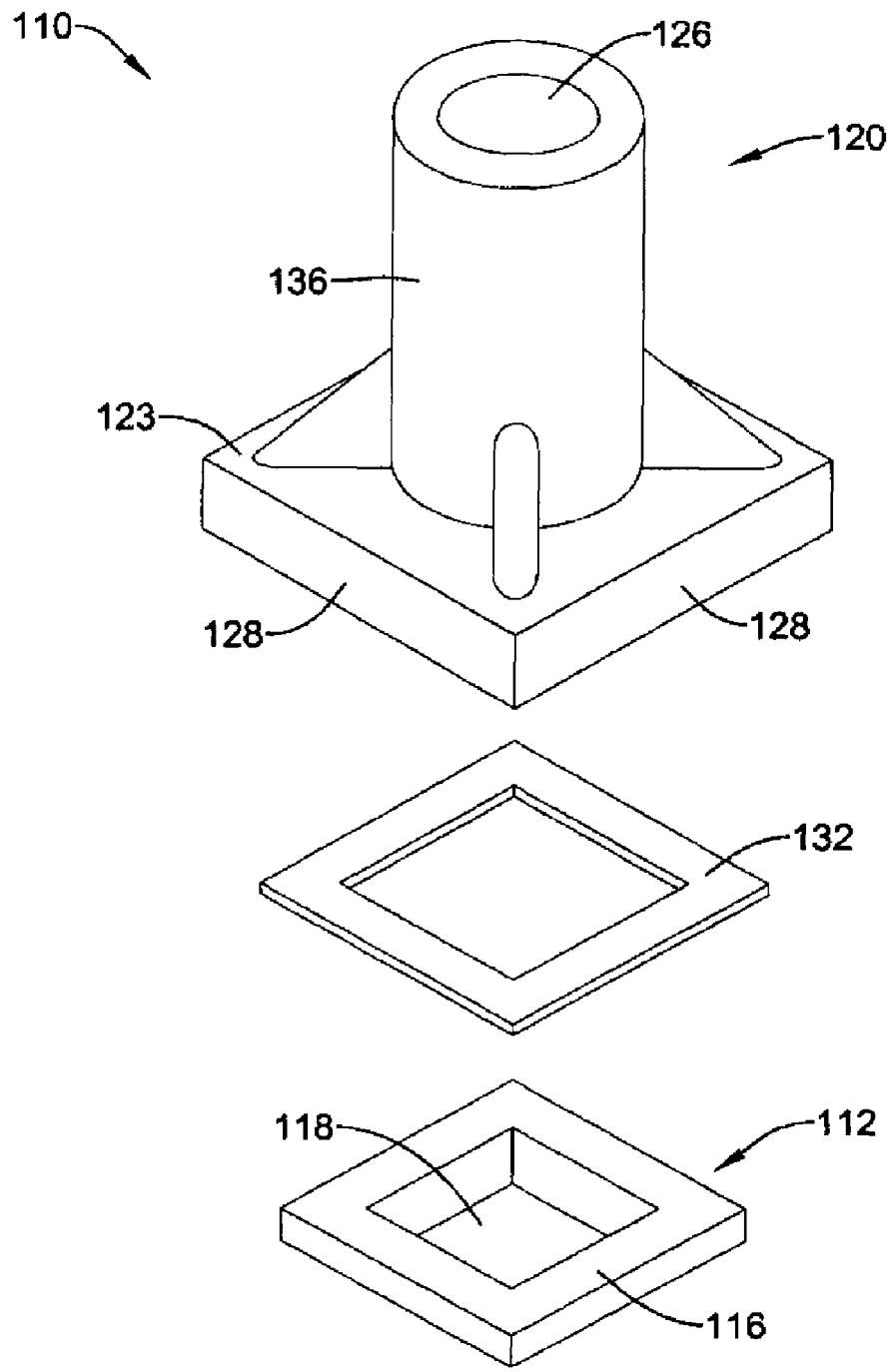
FIG. 4 is an exploded perspective top view of another illustrative pressure sensor.

FIG. 4 is an exploded perspective top view of another illustrative pressure sensor assembly 110. The pressure sensor assembly 110 may include a porting housing 120 configured to provide a fluid connection between a pressure sensing die 112 and a customer application. The housing 120 may be formed from plastic, polyamide, ceramic, metal, or any other suitable material. While the housing 120 is illustrated as having a generally square shape, it is contemplated the housing 120 may have any shape desired. The housing 120 may include a top side 123 and a bottom side 125 (better shown in FIG. 5). In some instances, the housing 120 may include a pressure port 126 extending between the top side 123 to the bottom side 125. The pressure port 126 may be configured to allow fluid communication between an application and the pressure sensing die 112 of the pressure sensor assembly 110.

In some instances, the pressure port 126 may be an elongated structure 136. For example, the elongated structure 136 may be a generally tubular member extending away from the top side 123 of the housing 120. It is contemplated that the pressure port 126 may include a variety of interface options and connections. For example, the elongated structure 136 could include an elbow, or may take on any other desired configuration or shape. It is further contemplated that the pressure port 126 may include a threaded or barbed region to facilitate connection to a device. It is further contemplated that, in some embodiments, the housing 120 may not include a port 126 at all, as described above.

In one illustrative embodiment, the pressure sensing die 112 may be a micromechanical sensor element fabricated using a silicon wafer and suitable fabrication techniques. The pressure sensing die 112 may include one or more pressure sensing elements and/or other circuitry (e.g. trim circuitry, signal conditioning circuitry, etc.) formed using suitable fabrication or printing techniques. In some cases, the pressure sensing die 112 may include a pressure sensing diaphragm 118 including one or more sensing elements, such as piezoresistive sensing components, formed thereon for sensing a deflection and thus a pressure differential between a top and bottom side of the pressure sensing diaphragm 118. The piezoresistors may be configured in such a manner that their resistance changes in response to the flexing of the pressure sensing diaphragm 118. In some instances, the pressure sensing diaphragm 118 may include a piezoresistive Wheatstone bridge built into a micro-machined silicon diaphragm structure. Thus, when the pressure sensor assembly 110 is arranged such that the pressure port 126 is in fluid communication with a fluid media, the pressure output of the pressure sensor assembly 110 may correspond to changes in the resistance of the piezoresistors.

In some embodiments, the pressure sensing diaphragm 118 may be fabricated by back-side etching a silicon die, however, it is contemplated that any suitable process may be used, as desired. The pressure sensing die 112 may include a back side 116 and an opposing front side 114. The back side 116 of the sensing die 112 may be bonded to the housing 120 using an adhesive, gasket, seal, or any other suitable bonding or sealing mechanism 132 (e.g. solder, eutectic, etc.). In some instances, the pressure sensing die 112 may be attached to the housing 120 using a stress isolating adhesive, such as, but not limited to a silicone room temperature vulcanizing (RTV) adhesive. The seal 132 may be configured to attach the sensing die 112 to the housing 120 while allowing the pressure sensing diaphragm 118 to be exposed to the pressure port 126 defined in the housing 120.

Figure 5:
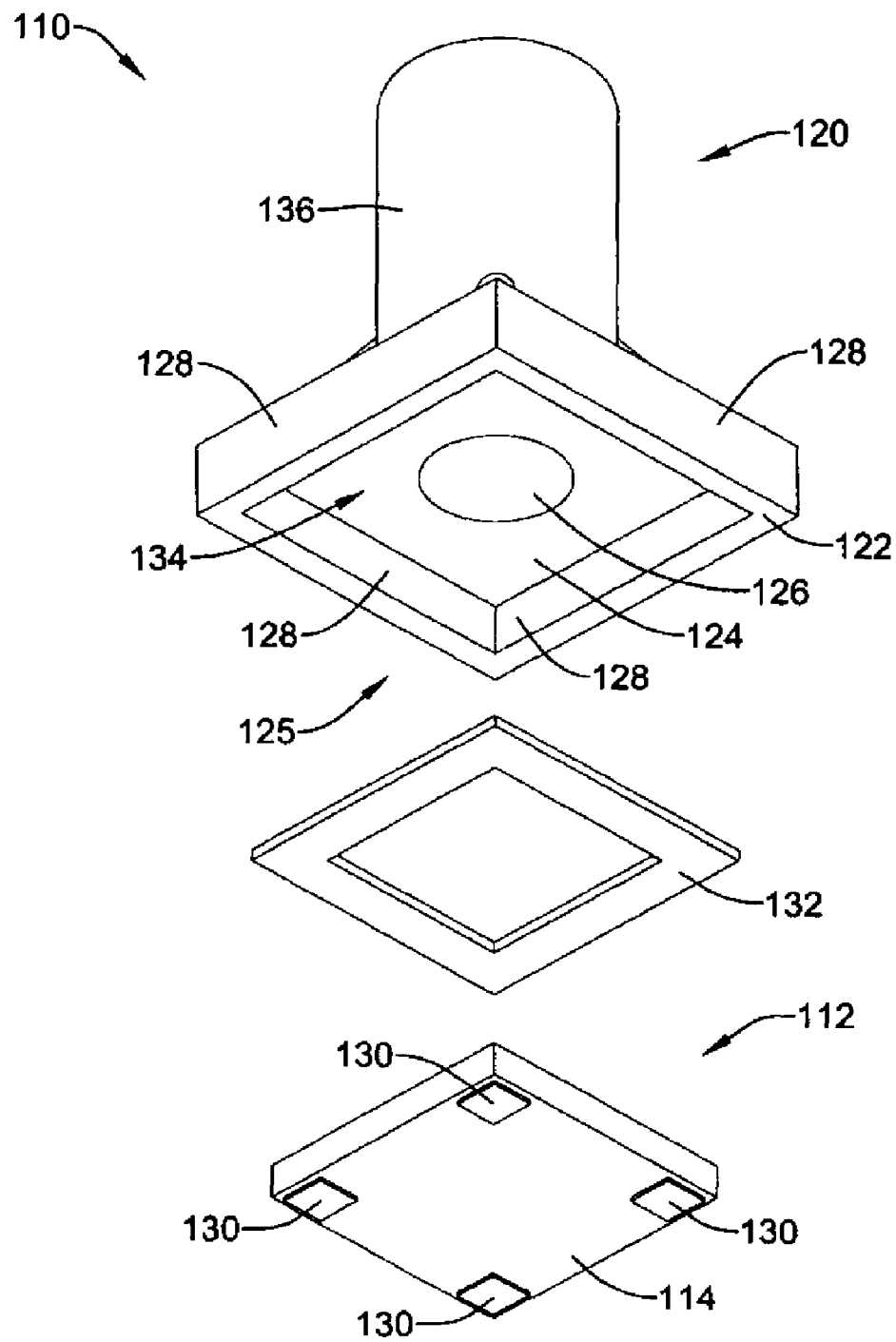
FIG. 5 is an exploded perspective bottom view of the illustrative pressure sensor of FIG. 4.

FIG. 5 is an exploded perspective bottom view of the illustrative pressure sensor 110 of FIG. 4. The bottom side 125 of the housing 120 may include a mounting side surface 122 and a sensing side surface 124. The mounting side 122 may be connected to and spaced a distance from the sensing side 124 by one or more lateral side walls 128. In some embodiments, the mounting side 122 may define an opening such that the sensing side 124 and the side walls 128 define a pressure sensing die cavity 134. In some embodiments, the pressure sensing die 112 is mounted within the die cavity 134 such that the back side 116 of the die 112 is facing and/or attached to an inside surface of the sensing side 124 of the housing 120. The sensing side 124 of the housing 120 may define a wall including the pressure port 126 such that when the pressure sensing die 112 is mounted within the die cavity 134, the pressure port 126 is in fluid communication with the pressure sensing diaphragm 118. A seal 132, gasket and/or layer of adhesive may be disposed between the sensing side 124 of the housing 120 and the back side 116 of the pressure sensing die 112 to secure the die 112 within the die cavity 134. When the pressure sensing die 112 is secured within the die cavity 134 of the housing, the front side 114 of the pressure sense die 112 may be positioned adjacent to (at, below or above) the mounting side 122 of the housing 120.

The pressure sensing die 112 may include one or more electrical bond pads 130 disposed on the front side 114 of the die 112. The electrical bond pads 130 may be positioned such that the bond pads 130 are accessible from outside of the housing 120. The electrical bond pads 130 may be electrically coupled to the one or more sensing elements of the pressure sensing diaphragm 118. In some embodiments, the pressure sensing die 112 may include four electrical bond pads 130, each connected to one of the four connections of a Wheatstone bridge that includes the sensing piezoresistors. However, it is contemplated that the pressure sensing die 112 may include any number of electrical bond pads 130, as desired. In some embodiments, the electrical bond pads 130 may be 0.7 millimeters by 0.3 millimeters or any other suitable size. This may allow a customer to install the pressure sensor assembly 110 directly to a printed circuit board (PCB) or other interface or substrate using, for example, a solder paste solution. In other illustrative embodiments, the electrical bond pads 130 may be relatively small with bump pads attached thereto such that the pressure sensor 110 may be attached to a special interface or PCB. In some cases, the electrical bond pads 130 may extend out past the mounting side 122 of the housing 120, but this is not required.

Figure 6:
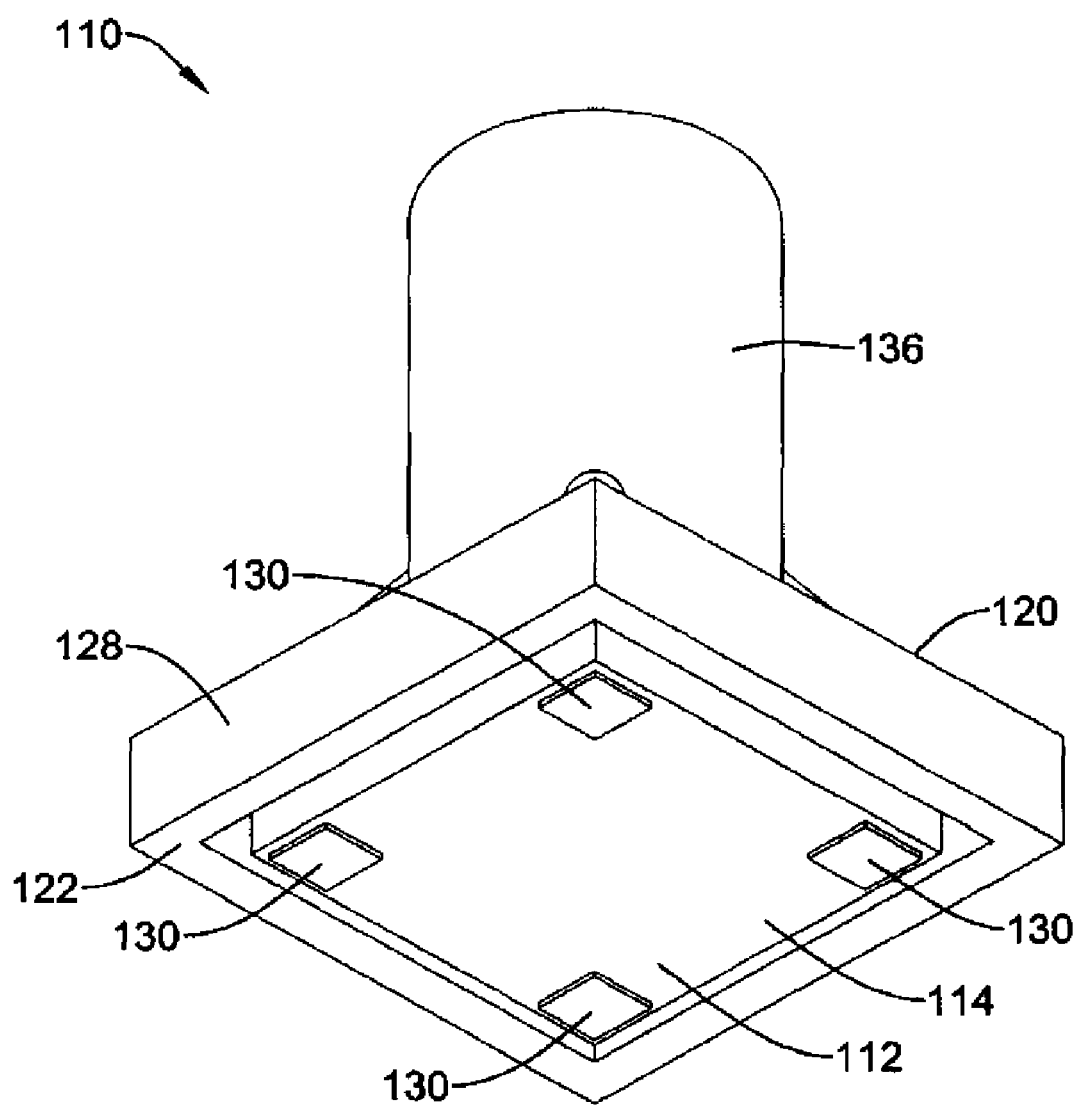
FIG. 6 is a perspective view of the illustrative pressure sensor of FIGS. 4 and 5.

FIG. 6 is a perspective view of the assembled pressure sensor 110 of FIG. 5. As can be seen, the pressure sensing die 112 may be sized and shaped to generally correspond to the size and shape of the pressure sensing die cavity 134. When assembled, in some instances, the front side 114 of the pressure sensing die 112 may be adjacent to, or positioned generally near the mounting side 122 of the housing 120. However, it is contemplated that in some embodiments, the front side 114 of the pressure sensing die 112 may be recessed within the die cavity 134 or may extend beyond the mounting side 122 of the housing 120. The pressure sensing die 112 may be positioned such that the electrical bond pads are exposed and suitable for soldering directly to corresponding bond pads on a PCB or other substrate. While not explicitly shown in FIG. 6, the pressure sensing die 112 may be positioned within the die cavity 134 such that the pressure sensing diaphragm 118 is in fluid communication with the pressure port 126. When so positioned, the pressure sensing diaphragm 118 may be free to flex such that the one or more pressure sensing elements may sense a deflection and thus a pressure differential between a top and bottom side of the pressure sensing diaphragm 118.

Those skilled in the art will recognize that the present disclosure may be manifested in a variety of forms other than the specific embodiments described and contemplated herein. Accordingly, departure in form and detail may be made without departing from the scope and spirit of the present disclosure.

What is claimed is:

1. A pressure sensor assembly suitable for mounting to a printed circuit board, comprising:
    a pressure sensor die including:
        a front side;
        a back side;
        a pressure sensing diaphragm;
        one or more piezoresistors coupled to the pressure sensing diaphragm for sensing a pressure induced stress in the pressure sensing diaphragm;
        two or more electrical bond pads positioned on the front side of the pressure sensor die, with each of the two or more electrical bond pads electrically coupled to one or more of the piezoresistors;
    a housing having a mounting side and a sensing side, with the sensing side defining a pressure port; and
    the pressure sensor die secured to the housing, with the back side of the pressure sensor die facing the sensing side of the housing with the pressure sensing diaphragm exposed to the pressure port, and with the front side of the pressure sensor die positioned adjacent to the mounting side of the housing with the two or more electrical bond pads of the pressure sensor die being accessible from outside of the housing such that the two or more electrical bond pads are exposed and suitable for soldering directly to two or more corresponding bond pads of the printed circuit board.

2. The pressure sensor assembly of claim 1, further comprising a seal between the back side of the pressure sensor die and the housing, wherein the seal is configured to expose the pressure sensing diaphragm of the pressure sensor die to the pressure port defined by the sensing side of the housing.

3. The pressure sensor assembly of claim 1, wherein the two or more electrical bond pads include bump bonds.

4. The pressure sensor assembly of claim 1, wherein the pressure sensor die is secured to the housing via an adhesive.

5. The pressure sensor assembly of claim 4, wherein the adhesive is a stress isolating adhesive.

6. The pressure sensor assembly of claim 5, wherein the adhesive is a silicone Room Temperature Vulcanizing (RTV) adhesive.

7. The pressure sensor assembly of claim 1, wherein the pressure port is an elongated pressure port that extends from adjacent the back side of the pressure sensor die and away from the back side of the pressure sensor die.

8. The pressure sensor assembly of claim 7, wherein at least part of the elongated pressure port is tubular in shape.

9. The pressure sensor assembly of claim 1, wherein the mounting side of the housing is open to allow the pressure sensor die to be inserted and secured to an inside surface of the housing.

10. The pressure sensor assembly of claim 9, wherein the pressure sensor die is secured to an inside surface of the sensing side of the housing.

11. The pressure sensor assembly of claim 9, wherein the housing includes side walls that extend from the sensing side of the housing to the mounting side.

12. The pressure sensor assembly of claim 1, wherein the pressure port is an aperture that extends though the sensing side of the housing.

13. A pressure sensor assembly, comprising:
a pressure port housing including a pressure sensing side and a mounting side, wherein the pressure sensing side includes a sensing side wall that defines a pressure port;
the pressure port housing further including a pressure sensing die cavity;
a pressure sensing die having a first side and an opposite second side, the pressure sensing die situated in the pressure sensing die cavity with a first side secured to the sensing side wall of the pressure port housing, the pressure sensing die having a pressure sensing diaphragm that is fluid communication with the pressure port; and
the second side of the pressure sensing die facing away from the sensing side of the pressure port housing and toward the mounting side with the two or more electrical bond pads of the pressure sensor die accessible from outside of the housing such that the two or more electrical bond pads can be electrically and physically connected to two or more corresponding bond pads on another substrate.

14. The pressure sensor assembly of claim 13, wherein the other substrate is a printed circuit board.

15. The pressure sensor assembly of claim 13, wherein the pressure port is an elongated pressure port.

16. The pressure sensor assembly of claim 13, wherein at least part of the elongated pressure port is tubular in shape.

17. The pressure sensor assembly of claim 13, further comprising a seal between the first side of the pressure sensing die and the sensing side wall of the pressure port housing.

18. The pressure sensor assembly of claim 13, wherein the pressure port housing further includes lateral side walls that extend from the sensing side wall of the sensing side to the mounting side, the sensing side wall and the lateral side walls defining the pressure sensing die cavity.

19. A pressure sensor assembly, comprising:
a pressure sensor die including:
a front side;
a back side;
a pressure sensing diaphragm;
one or more piezoresistors coupled to the pressure sensing diaphragm for sensing a pressure induced stress in the pressure sensing diaphragm;
two or more electrical bond pads positioned on the front side of the pressure sensor die, with each of the two or more electrical bond pads electrically coupled to one or more of the piezoresistors;
a housing having a mounting side, a sensing side, and lateral side walls extending from the sensing side to the mounting side, the sensing side and the lateral side walls defining a pressure sensing die cavity;
a pressure port defined in the sensing side of the housing;
the pressure sensor die secured within the pressure sensing die cavity of the housing to the sensing side of the housing via an adhesive;
wherein the back side of the pressure sensor die faces the sensing side of the housing with the pressure sensing diaphragm exposed to the pressure port and the front side of the pressure sensor die is positioned adjacent to the mounting side of the housing with the two or more electrical bond pads of the pressure sensor die being accessible from outside of the housing.

* * * * *